P. O. UNGER.
TURN TABLE OR SWIVEL.
APPLICATION FILED NOV. 21, 1918.
1,321,497.
Patented Nov. 11, 1919.
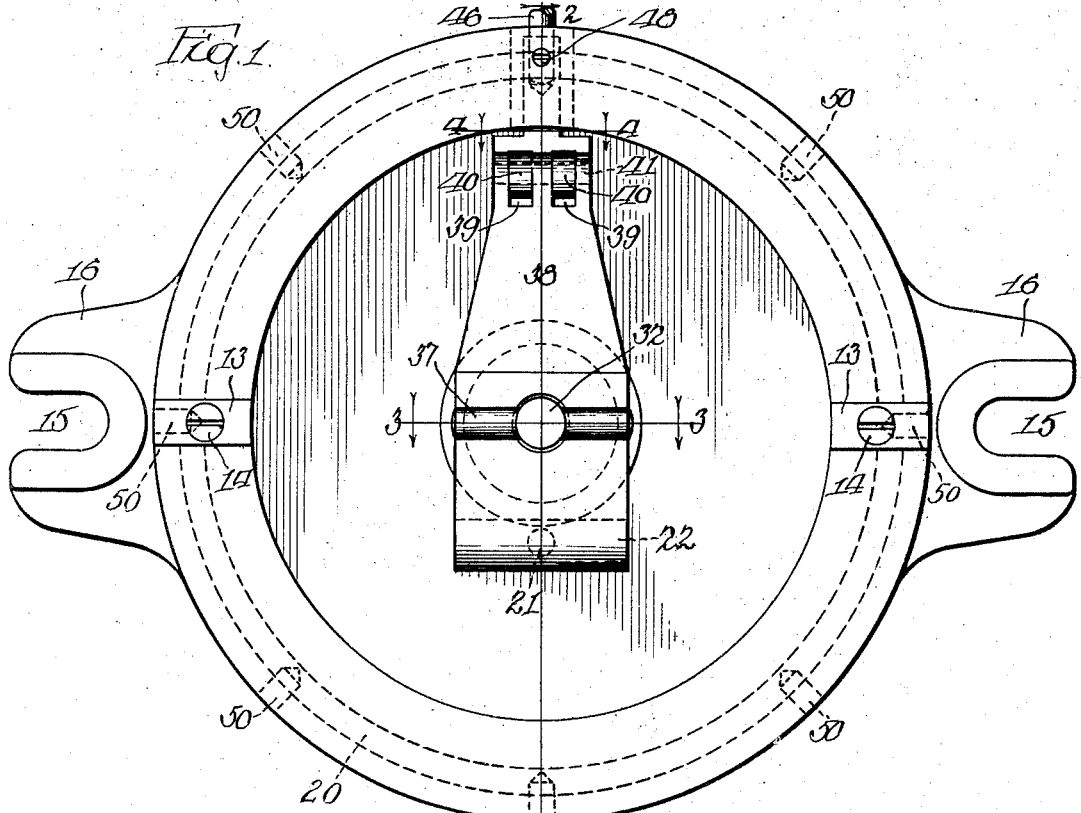
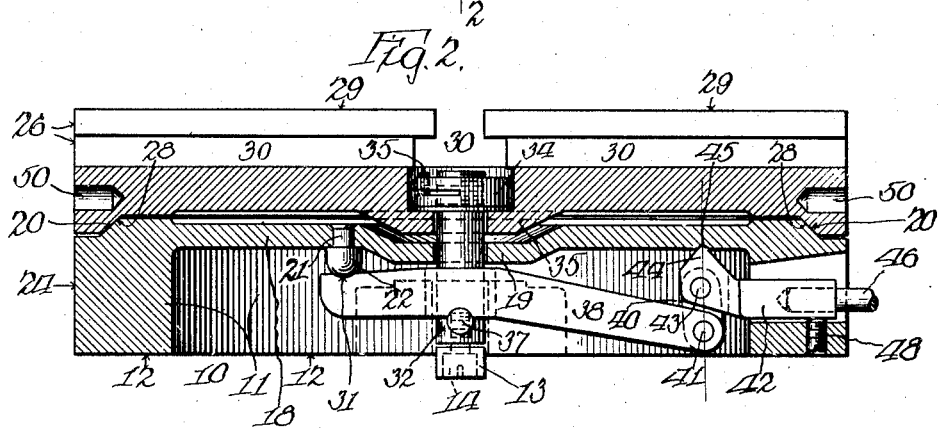
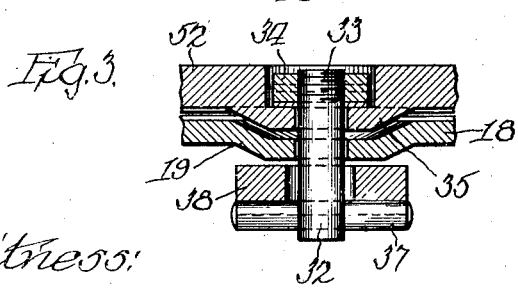
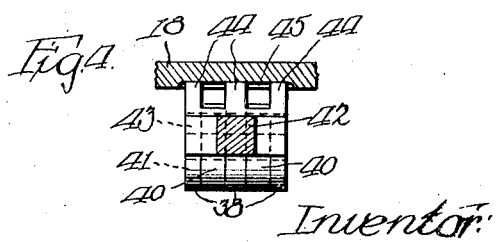
Inventor:
Paul Otto Unger
By Luther Johns, Atty.
Witness:
Leo J. Dubeais

UNITED STATES PATENT OFFICE.

PAUL OTTO UNGER, OF OAK PARK, ILLINOIS.

TURN-TABLE OR SWIVEL.

1,321,497.  Specification of Letters Patent.  Patented Nov. 11, 1919.

Application filed November 21, 1918. Serial No. 263,487.

*To all whom it may concern:*

Be it known that I, PAUL OTTO UNGER, a citizen of the United States, residing in the village of Oak Park, in the county of Cook and State of Illinois, have invented certain new and useful Improvements in Turn-Tables or Swivels, of which the following is a specification.

My invention relates to turntable or swivel devices as used for instance as attachments for milling machines and the like. Its principal objects are to provide a turntable or swivel device of simple and durable form and construction which has the properties of easy, quick and exact adjustment on the swivel axis. Other objects and advantages will appear hereinafter.

In the accompanying drawings, which form a part of this specification, I have illustrated these improvements in a highly advantageous form as an attachment for milling machines and the like. In these drawings Figure 1 is a bottom view of the device; Fig. 2 is a medial section as on line 2—2 of Fig. 1; Fig. 3 is a fragmentary section on the line 3—3 of Fig. 1; and Fig. 4 is a fragmentary section on the line 4—4 of Fig. 1.

Attachments of this class are applied to the bed plates of milling machines, etc., for holding thereon some object which it is desired to turn or move on the axis of the turntable. Such an object may be the work itself secured directly upon the turntable, or it may be a vise adapted to hold the work. The object in turning the work from time to time is to provide new surfaces for attack by the cutter of the machine, as is well understood in the art.

The device illustrated comprises first a base 10 which has an annular rim 11 nicely surfaced at its bottom 12 so as to rest accurately upon the bed plate. Two projecting blocks 13 are set into recesses diametrically opposite to each other in the base and are held rigidly by screws 14. These blocks serve as guides for positioning the device and are adapted to enter a slot in the bed plate in the usual way. The base 10 is held positively upon the bed plate by bolts in the recesses 15 in the ears 16 integral with the base.

The base 10 has a somewhat upstanding top or platform 18 having a central depending dish-shaped or recessed portion 19. On the base 10 there is provided an annular slanting or wedging surface shown at 20, which is formed so as to be on circular lines in planes parallel with the base surface 12, as, for instance, by turning both the surfaces 12 and 20 while the base 10 is carried on a mandrel in a lathe, or by first planing the surface 12, then securing it against the face plate of a lathe, and then cutting the surface 20 with the lathe tool. The outer annular surface 24 of the base 10 is preferably also turned true upon the axis of the surface 20. The base 10 in my practice is of cast iron.

The turntable illustrated is also an iron casting, and of the diameter of the base 10 and having its outer surface 26 substantially a continuation of the outer surface 24 of the base. A simple scale in degrees and minutes and a pointer, or a vernier scale, may be marked on the annular surfaces 24 and 26 to enable the workman to adjust the table accurately to the desired amount of rotation from time to time. Such a scale is not shown but is well known in connection with devices of this class.

The table has also an annular beveled or wedging surface, shown at 28, formed to coact with the surface 20 in supporting and tighteneing the table upon the base. The table always rests upon these bearing and interwedging or locking surfaces.

The object to be held, such as the work or vise, rests upon the top surface 29 of the table, and these surfaces 28 and 29 are accurately trued to each other, as in the way or ways pointed out for truing the surfaces 12 and 20. When the table is operatively resting upon the base, as shown in Fig. 2, the surfaces 12 and 20 are in parallel planes in all positions of rotative adjustment of the table.

The table has four diametric T-grooves or bolt-holding recesses 30, well known in the art, for holding the heads and shanks of bolts for tightening the work or vise upon the table.

The means illustrated for tightening or locking the table upon the base and for releasing these parts for relative movement comprise a system of links and levers, with pressure adjusting means, all so formed and arranged that by simply moving an operating lever in one direction or the other the result is obtained.

More specifically, I provide a centrally arranged pulling member or link in the form of a rod 32 screw-threaded at 33 and there provided with the pressure-adjusting nut 34. This nut is of the half-split type and has the locking screws 35 threaded in one of its bifurcations and impinging against the other. By retracting the screw 35 the nut 34 may be turned, and upon advancing the screw the nut becomes locked upon the threads at 33.

The table is centrally recessed as shown, to accommodate the nut 34 so that it will lie flush with or beneath the bottom surfaces of the T slots 30, which intersect or meet at that place. To admit of such recessing while maintaining desirable lightness with suitable strength the central bottom portion of the table is provided with the boss or extension 35 spaced from but encompassed by the adjacent central recess in the base formed by the lowered wall 19. The table and base are bored centrally for the rod 32.

In the other end portion of the pull rod or link 32 I provide the cross-pin or fulcrum element 37, which is a cylindrical shaft held rigidly in a diametric hole in the rod 32.

Fulcrumed on the pin 37 is the lever of the first class 38 bored to accommodate the rod 32 loosely and having its shorter end pivotally mounted upon the base 10, a rib-like pivoting member 22, convex at 31 where it engages a concavity in the lever, being held in place by the stem 21 which may be riveted to the wall 18. The lever 38 is preferably materially wide where it engages the fulcrum pin 37 and the pivot 22 for purposes of strength as well as to provide a well balanced pull upon the central rod 32.

The outer end of the lever 38 is milled to provide two recesses 39 for the accommodation of the two links 40, and a cross pin 41 holds these two links pivotally in position. Upon these two links 40 at their upper end is pivotally mounted the operating lever 42 by means of the pin 43. The lever 42 is formed with an upstanding end making it substantially a bell-crank, and this end portion is milled to provide slots for receiving the links 40. This end portion is tapered upward forming substantially a knife-edge pivot at 44 which is materially wide and strong and which engages a notch 45 in the wall 18 of the base. A hand rod 46 is insertible loosely in a recess in the end of the lever 42 for moving its free end up and down to tighten and release the table. A suitable opening is provided in the base for the lever 42.

In Fig. 2 the lever parts are shown in their table-locking position. It is to be noticed that in this position the pivot 43 is slightly beyond and toward the left of a right line drawn from the notch 45 to the pivot 41. The parts are therefore locked tightly in that position, for the pivot 43 is slightly beyond the "dead center line" of these three pivotal points. Upon raising the handle 46 the pivot 43 is moved to the right, as viewed in Fig. 2, through and beyond the dead center line, and thereupon the holding force upon the lever 38 is released, and the pivot 41 is drawn upward slightly, releasing its pull upon the link or pin 32 and consequently releasing the table from its tight engagement at the wedging surfaces 20 and 28. The table may thereupon be moved axially as desired.

The links 40 are two in number and arranged as shown and described principally for purposes of a well balanced construction. They constitute in effect only one link, and this link 40 forms with the lever 42 and the pivot 41 a toggle connection, the knuckle joint of which is the pivot 43. In practice this knuckle joint should pass but slightly beyond the dead center line described—just sufficiently to lock the parts. A stop arranged as desired may be provided to limit this locking movement. I provide an adjusting screw 48 for this purpose. Adjustment by the screw 48 will rarely if ever be required after the initial one. By means of the adjusting nut 34 the desired pressure for binding the table and base frictionally together is obtained. Upon lifting the lever 42 the handle 46 may be withdrawn and inserted in one of the recesses 50 for swinging the table around as desired.

By means of the coacting slanting surfaces at 20 and 28 the table is mounted upon the base for accurate rotation, and upon its being clamped down by means of the lever 38 and associated parts it automatically adjusts itself centrally with the desired precision. The invention is not limited in this regard to such slanting surfaces or to any slanting or wedging surfaces; but such or equivalent surfaces are peculiarly valuable in providing the self-adjusting feature mentioned as well as in coöperating with each other to produce a strong frictional engagement one with the other. These interengaging binding surfaces are preferably close to the outer margins of the base and table so as to provide a relatively wide seat in diametric directions and to increase the area of the binding surfaces over what they would be with shorter radii.

The construction illustrated is further advantageous in that these surfaces 20 and 28 are always maintained free from dust, chips, etc., and are self cleansing of excess of lubricating oil or foreign matter in the oil.

The invention is not limited to the particular system of links and levers shown, as, in view of this disclosure, persons skilled in the art will readily be able to provide variations of and modifications therefrom, without departing from the spirit of the invention set forth. The several parts not including the base and table are preferably made of steel. The drawings are substantially true to scale.

I claim:

1. In a device of the character described, the combination of a base, a turntable movably mounted on the base, and unitary hand-operable lever means for drawing the turntable bodily toward and upon the base for binding the two frictionally together.

2. In a device of the character described, the combination of a base, a turntable mounted for rotation on the base, and unitary hand-operable lever means for drawing the turntable bodily toward and upon the base for binding the two frictionally together.

3. In a device of the character described, the combination of a base, a turntable mounted for rotation on the base, and lever means including a toggle for drawing the turntable bodily toward and upon the base for binding the two frictionally together.

4. In a device of the character described, the combination of a base, a turntable mounted for rotation on the base, and means including a toggle for locking the turntable and base together.

5. In a device of the character described, the combination of a base having a friction surface thereon, a turntable having a coöperating friction surface thereon, said turntable being mounted for rotation on the base with said friction surfaces facing each other, and unitary hand-operable lever means for clamping said friction surfaces tightly upon each other and for automatically locking said turntable upon the base in clamped relation.

6. In a device of the character described, the combination of a base having a friction surface thereon, a turntable having a coöperating friction surface thereon, said turntable being mounted for rotation on the base with said friction surfaces facing each other, and lever means including a toggle for clamping said friction surfaces tightly upon each other.

7. In a device of the character described, the combination of a base having a friction surface thereon, a turntable having a coöperating friction surface thereon, said turntable being mounted for rotation on the base with said friction surfaces facing each other, a lever of the first class pivoted at one end upon the base and intermediate its ends pivotally connected to said turntable, a toggle pivotally connected to the other end of said lever of the first class and to the base for moving said last mentioned lever, and means for moving the knuckle joint of said toggle.

8. In a device of the character described, the combination of a base having a friction surface thereon, a turntable having a coöperating friction surface thereon, said turntable being mounted for rotation on the base with said friction surfaces facing each other, a lever of the first class pivoted at one end upon the base and intermediate its ends pivotally connected to said turntable, a link pivotally connected to the other end of said lever of the first class, a lever pivotally connected intermediate its ends to said link, said second lever having one end pivoted upon said base, and means for moving the free end of said second lever.

9. In a device of the character described, the combination of a base having an annular friction surface thereon, a turntable mounted for rotation on said base and having an annular friction surface closely adjacent to and facing said other friction surface, a lever carried by the base, a connection operatively between said lever and the central portion of said turntable, and means for moving said lever to bind said friction surfaces tightly together.

10. In a device of the character described, the combination of a base having an annular friction surface thereon, a turntable mounted for rotation on said base and having an annular friction surface closely adjacent to and facing said other friction surface, and lever means and link means including a toggle carried by the base and operatively connected centrally of the turntable for binding said friction surfaces tightly together.

11. In a device of the character described, the combination of a base having an annular slanting wedging surface thereon, a turntable having an annular slanting wedging surface fitting said other surface and resting thereon, whereby the table may rotate upon the base upon said surfaces as a bearing, and unitary hand-operable lever means for clamping said surfaces tightly together.

12. In a device of the character described, the combination of a base having an annular slanting wedging surface thereon, a turntable having an annular slanting wedging surface fitting said other surface and resting thereon, whereby the table may rotate upon the base upon said surfaces as a bearing, and means including a lever connected centrally of the turntable for clamping said surfaces tightly together.

13. In a device of the character described, the combination of a base having an annular slanting wedging surface thereon, a turntable having an annular slanting wedging surface fitting said other surface and resting thereon, whereby the table may rotate upon the base upon said surfaces as a bearing, and lever means including a toggle carried by the base and connected centrally of the turntable for clamping said surfaces tightly together.

14. In a device of the character described, the combination of a base having an annular slanting wedging surface thereon, a turntable having an annular slanting wedging surface fitting said other surface and resting thereon, whereby the table may rotate upon the base upon said surfaces as a bearing, a lever pivoted upon the base and pivotally connected to said turntable centrally thereof, a toggle connected to said lever at one end of the toggle, the other end of the toggle being pivoted upon a relatively fixed part carried by the base, and means for moving the knuckle joint of said toggle.

15. In a device of the character described, the combination of a base, a turntable mounted for rotation thereon, and unitary hand-operable, quick acting, self locking means for drawing the turntable bodily toward and upon the base for binding the two frictionally together.

16. In a device of the character described, the combination of a base, a turntable mounted for rotation on the base, unitary lever means for drawing the turntable bodily toward and upon the base for binding the two frictionally together, and means for adjustably increasing and decreasing the binding force of said lever means.

17. In a device of the character described, the combination of a base, a turntable mounted for rotation on the base, unitary lever means including a pressure exerting toggle for drawing the turntable bodily toward and upon the base for binding the two frictionally together, and a stop for limiting the movement of the knuckle joint of the toggle to a position thereof slightly beyond its dead center in its tightening movement.

18. In a device of the character described, the combination of a base, a turntable mounted for rotation on the base, unitary means including a pressure-exerting toggle for binding the two frictionally together, and means for adjusting the binding pressure exerted by said toggle.

19. In a device of the character described, the combination of a base, a turntable mounted for rotation on the base, lever means for drawing the turntable and base clampingly together, and means for adjusting the pressure of said clamping means.

20. In a device of the character described, the combination of a base, a turntable mounted for rotation on the base, a threaded pulling member carried centrally by the base, an adjusting nut on said pulling member for increasing and decreasing its effective length, and lever means connected to said pulling member and carried by the base for drawing the table and base frictionally together.

21. In a device of the character described, the combination of a base, a work-holding table movably mounted on the base, hand-operable means for drawing the turntable bodily toward and upon the base for clamping the two frictionally together, and means for automatically locking the base and table in their clamped relation.

22. In a device of the character described, the combination of a base having a substantially central opening therethrough, a turntable movably mounted on the base, said turntable carrying a pulling member extending through the opening of the base, means beneath the turntable and operatively connected with said pulling member for exerting pulling strains upon said member to bind the table frictionally upon the base.

23. In a device of the character described, the combination of a base having a substantially central opening therethrough, a turntable mounted on the base, a pulling member carried by the turntable and projecting through the opening in the base, a lever engaging said pulling member intermediate the ends of the lever, said lever being fulcrumed at one end operatively upon said base, the other end of said lever pivotally carrying a link, a second lever mounted upon said link, said second lever being in engagement with the base, the place of such engagement and the connections of the two levers with said link being in a straight line when the table is clamped upon the base, said second lever being hand-operable to throw said three connections out of alinement and thereby release the table, and means for adjusting the effective length of the connection between the table and said first mentioned lever.

PAUL OTTO UNGER.